(12) United States Patent
Martling et al.

(10) Patent No.: US 8,504,276 B2
(45) Date of Patent: Aug. 6, 2013

(54) GAS TURBINE ENGINE CONTROLS FOR MINIMIZING COMBUSTION DYNAMICS AND EMISSIONS

(75) Inventors: Vincent C. Martling, Jupiter, FL (US); Peter So, San Francisco, CA (US); Zhenhua Xiao, Palm Beach Gardens, FL (US); Plazi Ricklin, Palm Beach Gardens, FL (US)

(73) Assignee: Power Systems Mfg., LLC, Jupiter, FL (US)

( * ) Notice: Subject to any disclaimer, the term of this patent is extended or adjusted under 35 U.S.C. 154(b) by 1221 days.

(21) Appl. No.: 12/039,183

(22) Filed: Feb. 28, 2008

(65) Prior Publication Data

US 2009/0222187 A1 Sep. 3, 2009

(51) Int. Cl.
F02M 63/02 (2006.01)

(52) U.S. Cl.
USPC ............... 701/100; 701/36; 701/99; 701/101; 701/103; 701/104; 123/406.25; 123/406.47; 60/773; 60/776; 60/793; 60/39.24; 60/39.281

(58) Field of Classification Search
USPC ...... 73/112–114; 700/286–297; 701/99–110
See application file for complete search history.

(56) References Cited

U.S. PATENT DOCUMENTS

| | | | | |
|---|---|---|---|---|
| 3,921,390 A * | 11/1975 | Stoltman | | 60/39.27 |
| 5,339,636 A * | 8/1994 | Donnelly et al. | | 60/734 |
| 5,584,171 A * | 12/1996 | Sato et al. | | 60/773 |
| 5,636,507 A * | 6/1997 | Rajamani et al. | | 60/773 |
| 5,661,969 A * | 9/1997 | Beebe et al. | | 60/39.281 |
| 5,802,854 A * | 9/1998 | Maeda et al. | | 60/737 |
| 6,226,974 B1 * | 5/2001 | Andrew et al. | | 60/772 |
| 6,393,355 B1 * | 5/2002 | Muramatsu | | 701/100 |
| 6,408,611 B1 * | 6/2002 | Keller et al. | | 60/773 |
| 6,708,496 B2 * | 3/2004 | Gadde et al. | | 60/773 |
| 6,715,295 B2 * | 4/2004 | Gadde et al. | | 60/775 |
| 6,715,916 B2 | 4/2004 | Tomlinson et al. | | |
| 6,805,483 B2 | 10/2004 | Tomlinson et al. | | |
| 6,814,060 B1 | 11/2004 | Solomons et al. | | |
| 7,162,875 B2 * | 1/2007 | Fletcher et al. | | 60/773 |
| 7,260,937 B2 * | 8/2007 | Kothnur et al. | | 60/773 |
| 7,565,805 B2 * | 7/2009 | Steber et al. | | 60/776 |
| 7,681,401 B2 * | 3/2010 | Ziminsky et al. | | 60/773 |
| 7,874,161 B2 * | 1/2011 | Williams | | 60/772 |
| 8,015,826 B2 * | 9/2011 | Myers et al. | | 60/785 |
| 2003/0163288 A1 * | 8/2003 | Follin et al. | | 702/188 |
| 2003/0192316 A1 * | 10/2003 | Rowe et al. | | 60/773 |
| 2004/0025512 A1 * | 2/2004 | Davis, Jr. et al. | | 60/773 |
| 2004/0117148 A1 * | 6/2004 | Davies | | 702/182 |
| 2004/0255594 A1 * | 12/2004 | Baino et al. | | 60/773 |
| 2004/0255595 A1 * | 12/2004 | Morgan et al. | | 60/773 |
| 2005/0114010 A1 * | 5/2005 | Healy et al. | | 701/100 |
| 2005/0166595 A1 * | 8/2005 | Fletcher et al. | | 60/703 |
| 2005/0204745 A1 * | 9/2005 | Hirayama et al. | | 60/773 |
| 2005/0262825 A1 * | 12/2005 | Certain | | 60/39.281 |
| 2006/0010876 A1 * | 1/2006 | Hoffmann et al. | | 60/773 |

(Continued)

Primary Examiner — Jonathan M Dager
(74) Attorney, Agent, or Firm — Shook, Hardy & Bacon L.L.P.

(57) ABSTRACT

Embodiments for controlling a gas turbine engine to minimize combustion dynamics and emissions are disclosed. Methods and an apparatus are provided for controlling the gas turbine engine where a compressor inlet temperature is measured and a turbine reference temperature is calculated in real-time and utilized to determine the most-efficient fuel splits and operating conditions for each of the fuel circuits. The fuel flow for the fuel circuits are then adjusted according to the identified fuel split.

9 Claims, 13 Drawing Sheets

(56) References Cited

U.S. PATENT DOCUMENTS

| | | | |
|---|---|---|---|
| 2006/0042258 A1* | 3/2006 | Gadde et al. | 60/772 |
| 2007/0089424 A1* | 4/2007 | Venkataramani et al. | 60/773 |
| 2007/0113560 A1* | 5/2007 | Steber et al. | 60/773 |
| 2007/0125090 A1* | 6/2007 | Martis et al. | 60/773 |
| 2007/0157624 A1* | 7/2007 | Bland et al. | 60/776 |
| 2007/0214795 A1* | 9/2007 | Cooker et al. | 60/772 |
| 2007/0271024 A1* | 11/2007 | Fujii et al. | 701/100 |
| 2008/0229754 A1* | 9/2008 | Goebel et al. | 60/772 |
| 2009/0113896 A1* | 5/2009 | Fukuda | 60/784 |
| 2009/0281737 A1* | 11/2009 | Stadler et al. | 702/34 |

* cited by examiner

PM1 Split Schedule

| TTRF (deg. F) | CTIM (deg. F) | | | | | | |
|---|---|---|---|---|---|---|---|
| | -20 | 0 | 20 | 40 | 60 | 80 |
| 2200 | 24 | 22 | 21 | 20.5 | 20 | 20 |
| 2300 | 21 | 19 | 18.5 | 18.5 | 18 | 18 |
| 2400 | 18 | 17 | 16 | 15 | 15 | 15 |
| 2450 | 17 | 16 | 16 | 15 | 15 | 15 |

Quat Split Schedule

| TTRF (deg. F) | CTIM (deg. F) | | | | | | |
|---|---|---|---|---|---|---|---|
| | -20 | 0 | 20 | 40 | 60 | 80 |
| 2200 | 5 | 5 | 5 | 5 | 5 | 5 |
| 2300 | 7 | 7 | 7 | 7 | 7 | 7 |
| 2400 | 11 | 10 | 9 | 9 | 9 | 9 |
| 2450 | 12 | 11 | 10 | 10 | 10 | 10 |

PM3 Split Schedule

| TTRF (deg. F) | CTIM (deg. F) | | | | | | |
|---|---|---|---|---|---|---|---|
| | -20 | 0 | 20 | 40 | 60 | 80 |
| 2200 | 65 | 65 | 65 | 67 | 67 | 67 |
| 2300 | 64 | 64 | 64 | 65 | 65 | 65 |
| 2400 | 62 | 62 | 62 | 63 | 63 | 63 |
| 2450 | 61 | 61 | 61 | 63 | 63 | 63 |

GAS TURBINE ENGINE CONTROLS FOR MINIMIZING COMBUSTION DYNAMICS AND EMISSIONS

TECHNICAL FIELD

The present invention relates to gas turbine engines. More particularly, embodiments of the present invention relate to apparatus and method for reducing combustion dynamics and emissions.

BACKGROUND OF THE INVENTION

Gas turbine engines operate to produce mechanical work or thrust. Land-based gas turbine engines typically have a generator coupled thereto for the purposes of generating electricity. There are a number of issues that affect the overall performance and durability of the engine components, especially the combustion section. The combustion process creates varying pressure oscillations and dynamics in the combustion hardware that can result in significant wear. Specifically, the pressure oscillations can cause mating hardware to vibrate and move relative to one another. Excessive combustion dynamics can cause premature wear of mating hardware such that the hardware must be repaired or replaced.

Typically, gas turbine combustors comprise multiple fuel circuits, depending on the quantity and location of the fuel nozzles as well as the combustor operating conditions. For example, a General Electric Frame 7FA gas turbine engine that utilizes a dry-low NOx (DLN) 2.6 combustor, has six main fuel nozzles per combustor and additional fuel injectors located radially about the combustor case, known as quaternary nozzles. A different quantity of these fuel nozzles operate together as the engine increases and decreases in power in an effort to minimize oxides of nitrogen (NOx) emissions and combustion dynamics in the combustor. For this engine design, there are four different fuel circuits associated with the different nozzles, PM1, PM2, PM3, and quaternary, with each circuit requiring a specific fuel flow rate depending on the operating conditions.

SUMMARY

The invention is defined by the claims below, not by this Summary, which is provided to introduce a selection of concepts in a simplified form that are further described below in the Detailed Description. Embodiments of the present invention are directed towards a system and method for, among other things, minimizing combustion dynamics and emissions in a gas turbine engine.

The present invention provides embodiments for controlling a gas turbine engine to minimize combustion dynamics and emissions. In an embodiment of the present invention a way is provided for controlling a gas turbine engine in which a compressor inlet temperature is measured and a turbine reference temperature is calculated. Utilizing a look-up table for a given fuel circuit, the turbine reference temperature and measured compressor inlet temperature are located in the table or interpolated from values in the table, and a fuel split corresponding to these temperatures is identified. The fuel flow for the fuel circuit is adjusted according to the identified fuel split.

In an additional embodiment, an alternate way is provided of controlling a gas turbine engine to minimize combustion dynamics and emissions. In this embodiment of the invention a method is provided for controlling a gas turbine engine in which a compressor inlet temperature is measured and a turbine reference temperature is calculated and from which a baseline fuel schedule for a given fuel circuit is selected which corresponds to the turbine reference temperature. A baseline fuel split corresponding to the turbine reference temperature is then determined. Next, a bias parameter, which is a percentage change to the fuel split, is determined with the bias parameter varying as a function of the measured compressor inlet temperature. The fuel flow to the fuel circuit is then adjusted to the sum of the baseline fuel split and the bias parameter.

In a further embodiment, a gas turbine engine is provided comprising an inlet, a compressor, at least one combustor having at least two fuel circuits, a turbine, and a control system. The control system has a processor and a memory containing a series of computer-readable instructions that measures a compressor inlet temperature in real-time and calculates a turbine reference temperature with these temperatures being used to identify a fuel split for each fuel circuit of the combustor.

By determining and controlling the fuel flow to the fuel circuits as a function of both a compressor inlet temperature and turbine reference temperature, combustion dynamics can be reduced. Extremely lean fuel conditions, which tend to cause pressure fluctuations in the combustor and create combustion noise and vibration, are hereby minimized in the present invention when both compressor inlet temperature and turbine reference temperature are used to determine fuel flow.

Additional advantages and features of the present invention will be set forth in part in a description which follows, and in part will become apparent to those skilled in the art upon examination of the following, or may be learned from practice of the invention.

BRIEF DESCRIPTION OF THE SEVERAL VIEWS OF THE DRAWING

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Figure 1:
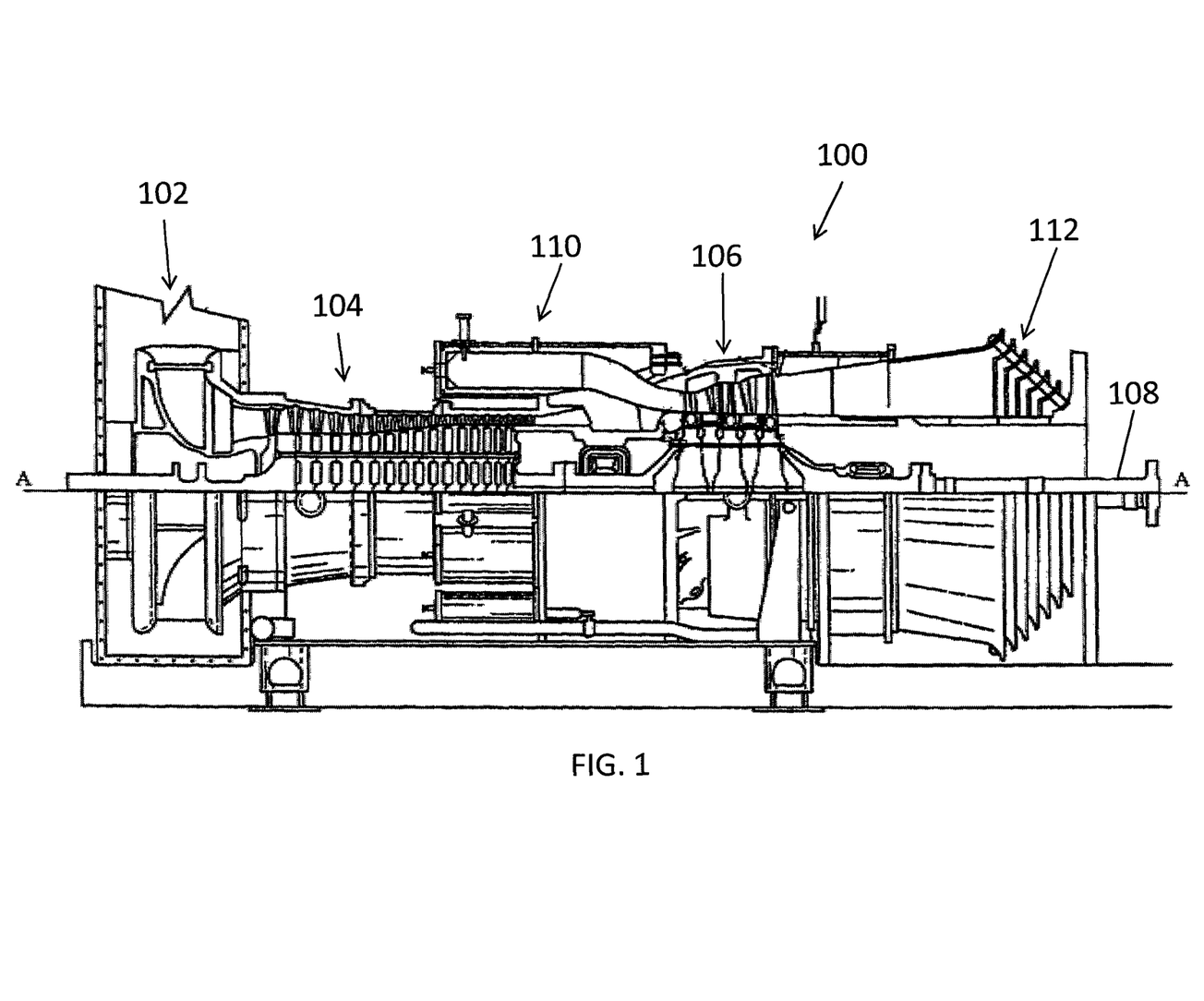
FIG. 1 depicts a cross section view of a gas turbine engine.
Figure 2:
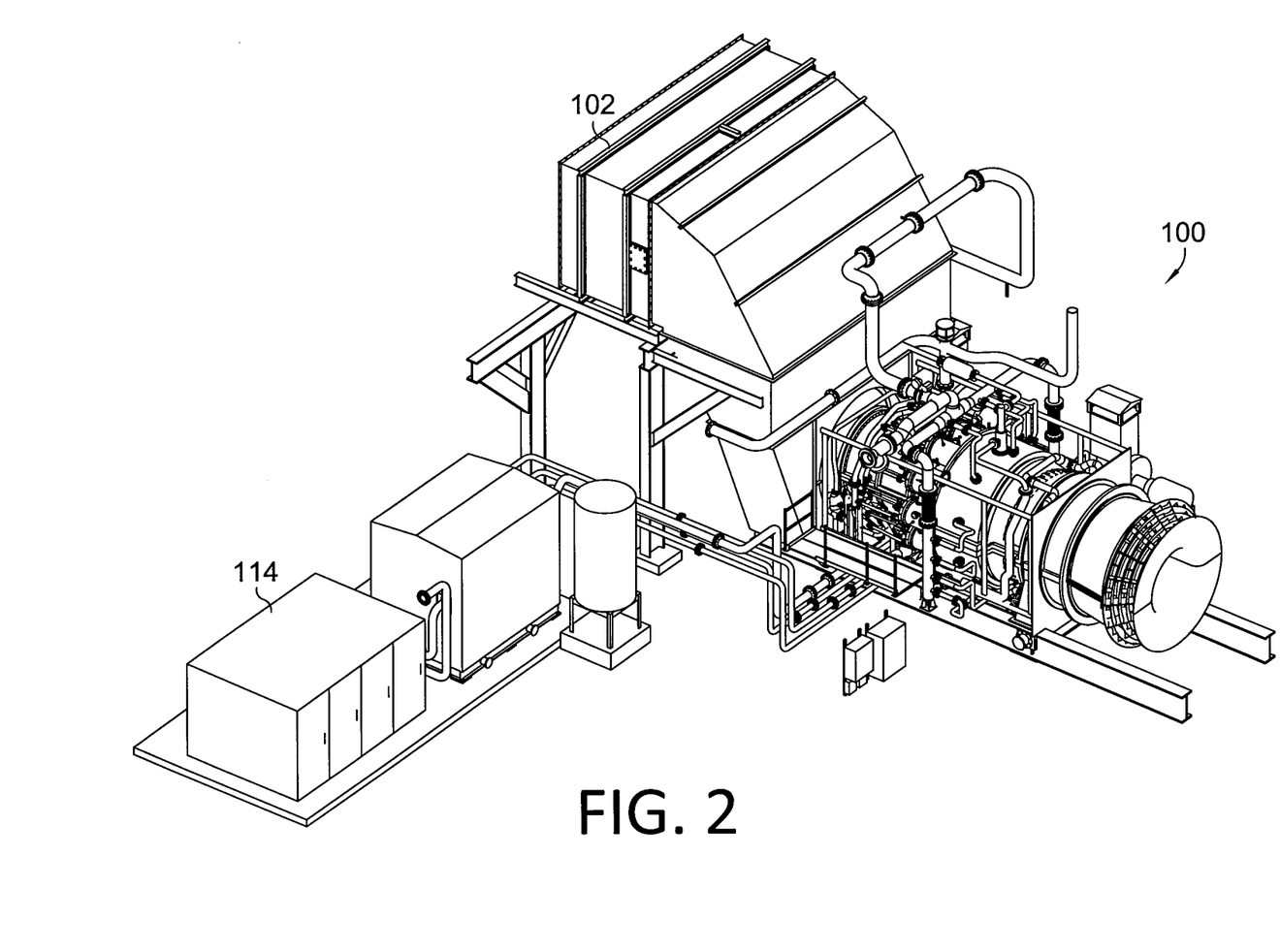
FIG. 2 depicts a perspective view of a gas turbine engine.

Referring initially to FIGS. 1 and 2, a gas turbine engine 100 for which the present invention is utilized is shown. The gas turbine engine 100 comprises an inlet 102, a compressor 104 that is coupled to a turbine 106 along a shaft 108 coaxial with axis A-A. At least one combustor 110 is in fluid communication with the compressor 104 and mixes fuel with the air from the compressor 104 and ignites this mixture so as to create hot combustion gases at an elevated pressure. The hot combustion gases from the at least one combustor 110 pass through the turbine 106, whereby work is extracted from the gases as the turbine 106 rotates and mechanically drives the compressor 104 through the shaft 108, and possibly also an electrical generator (not shown). The gases then pass to the exhaust 112. A control system 114, which comprises hardware and software components, is a device that is utilized to direct the function of the gas turbine engine 100 based on a variety of inputs. An example of the control system 114 is a Mark V controller produced by General Electric Company. The control system 114 has individual valves that govern the total amount of fuel and fuel distribution (or fuel split). The total amount of fuel is based on either a speed control set point, Megawatt set point, or exhaust temperature relationship. The fuel distribution is based on the engine operating mode and a pre-determined schedule. The control system described above can schedule fuel for four different fuel circuits.

Figure 3A:
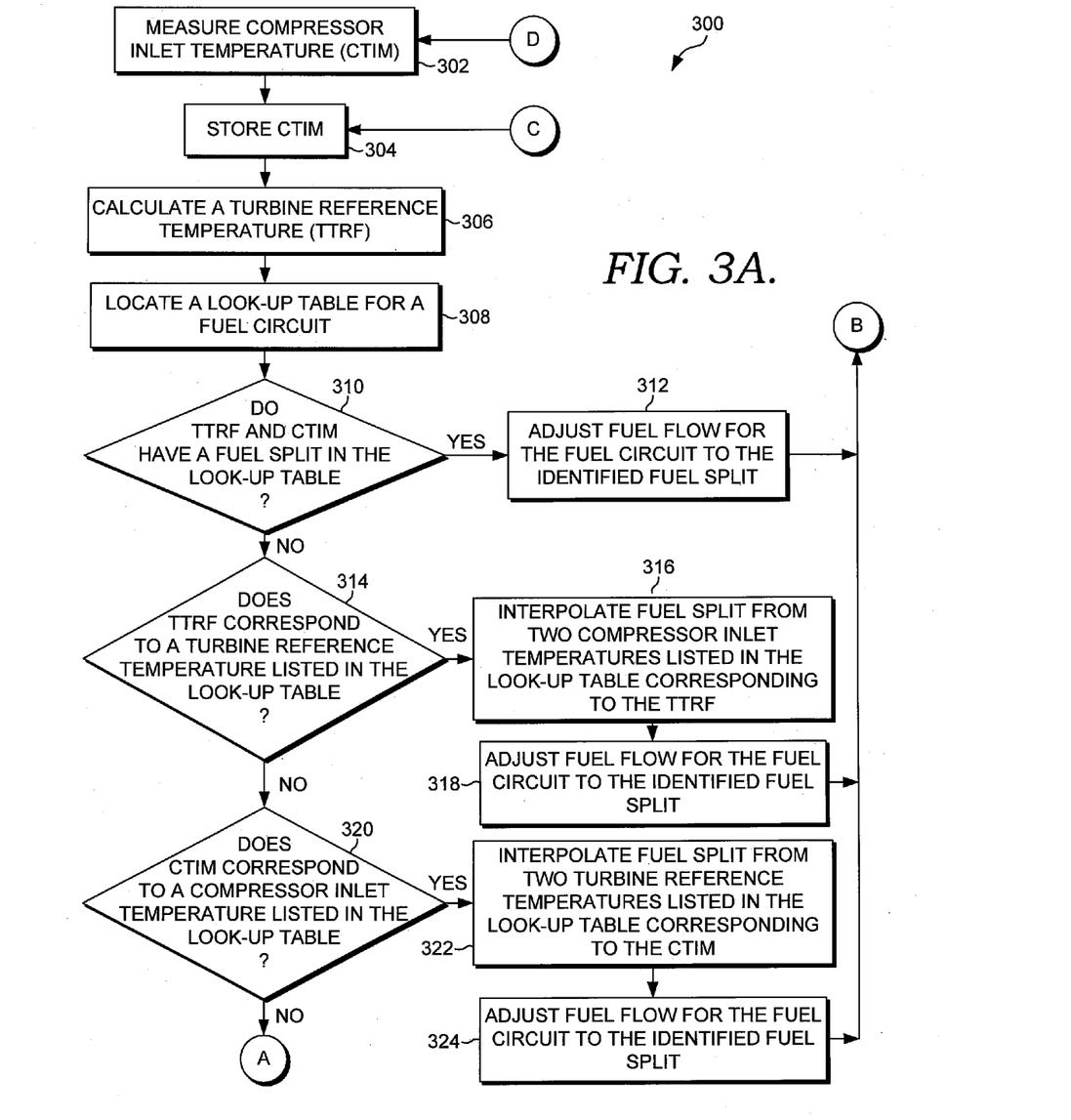
FIGS. 3A and 3B depict a way of controlling the fuel flow for a gas turbine engine in accordance with an embodiment of the present invention.
Figure 3B:
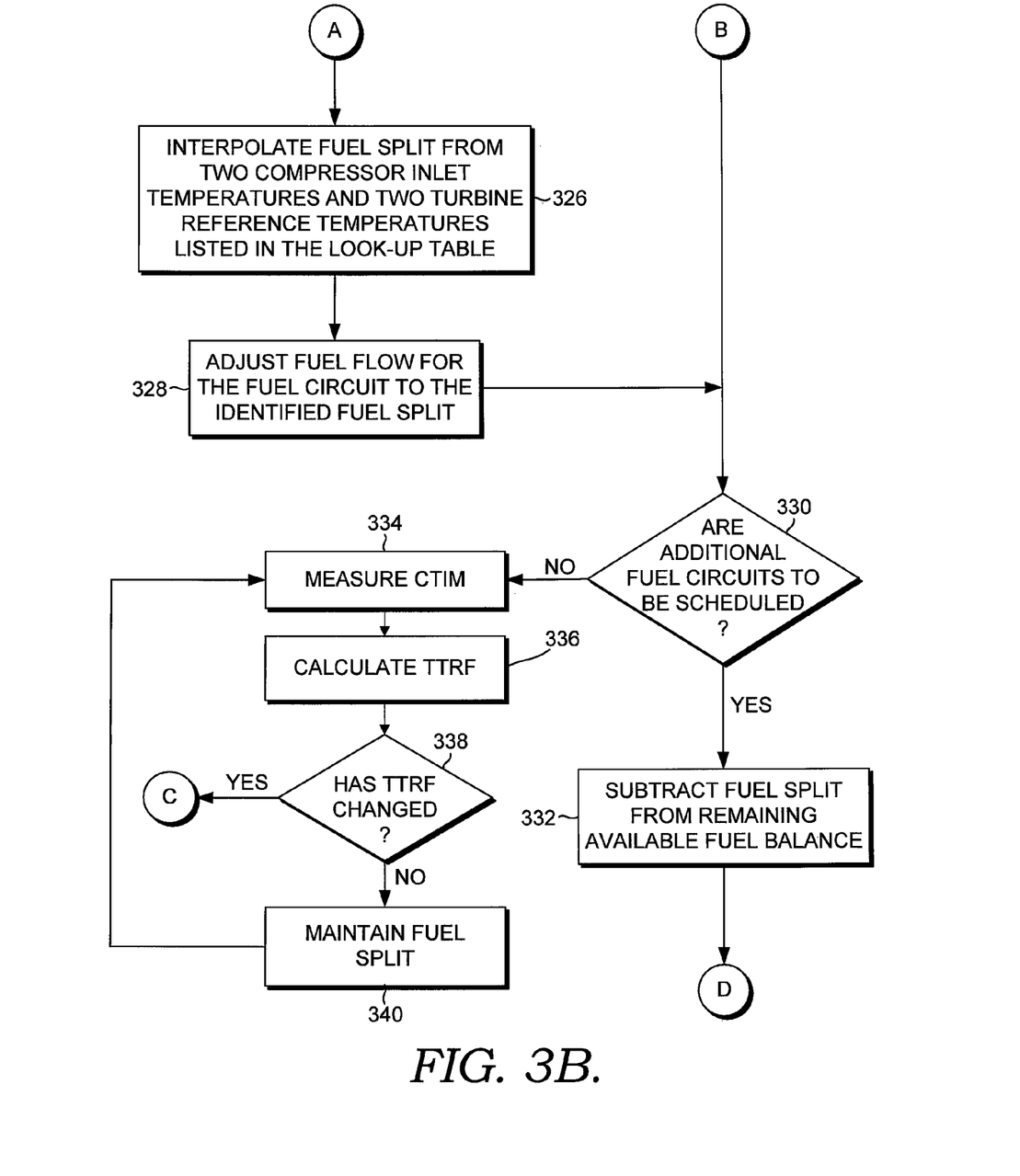

A method of controlling the gas turbine engine 100 is shown in FIGS. 3A and 3B. The embodiment disclosed in these FIGS depicts a way of controlling a gas turbine engine having a compressor, at least one combustor, a turbine, and a control system, in which the control system utilizes a look-up table of data in order to more efficiently schedule the fuel flow for a fuel circuit. The method 300 comprises a step 302 of measuring a compressor inlet temperature (CTIM). The temperature is typically measured utilizing one or more thermocouples located near the bellmouth of the inlet 102. The CTIM is then stored in the memory of the controller 112 in a step 304. In a step 306, the controller calculates a turbine reference temperature (TTRF). As one skilled in the art will understand, the TTRF is calculated in real-time, as the gas turbine engine operates, and is based on several measured parameters as well as various constants. For example, the TTRF is a function of compressor discharge pressure, exhaust pressure, and the change in pressure, or pressure drop, across the combustion system as well as other conditions. This calculation also varies depending on the engine site in order to account for geographic and climactic variables.

Figure 4:
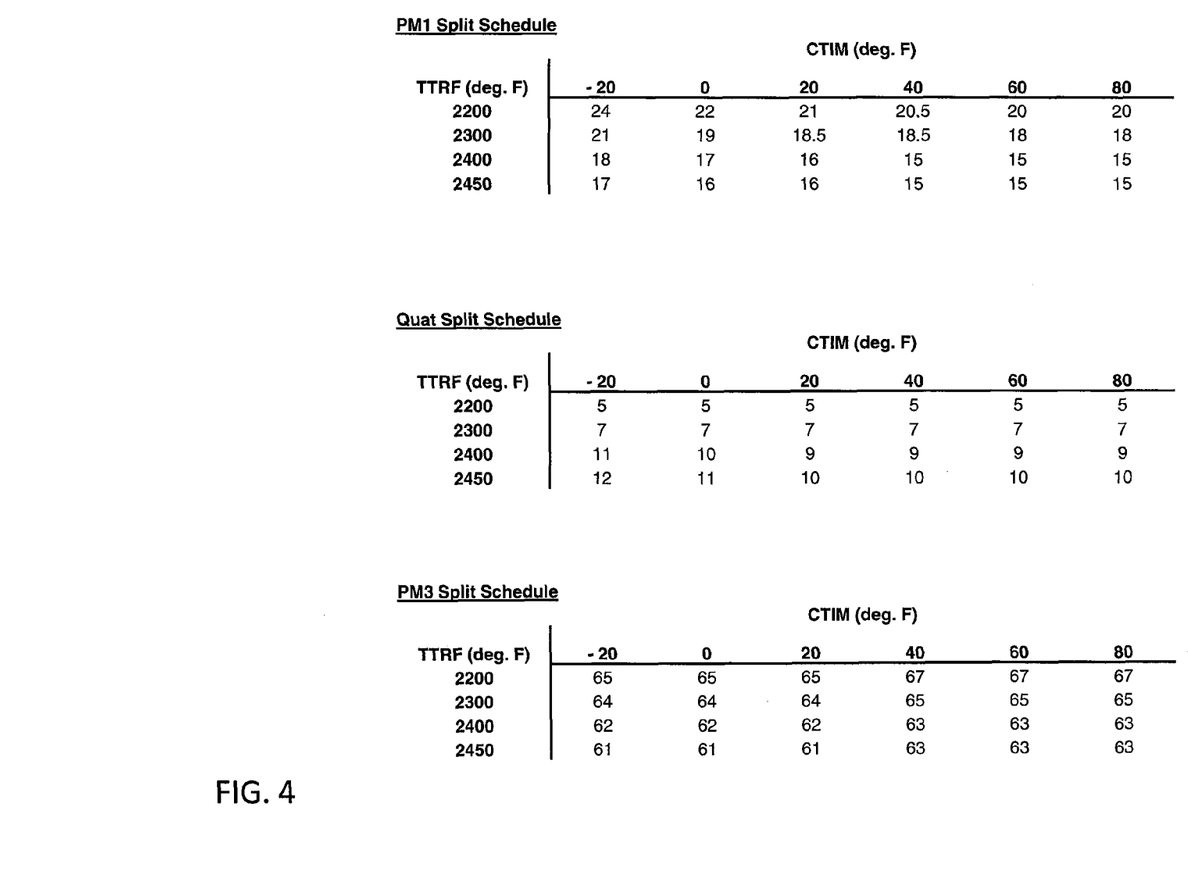
FIG. 4 depicts a fuel schedule look-up table in accordance with the method depicted in FIG. 3.

For the embodiment disclosed in FIGS. 3A and 3B, in a step 308, the look-up table for a given fuel circuit for which the fuel flow being determined is located. Example look-up tables for three fuel circuits, PM1, Quaternary, and PM3 are shown in FIG. 4, which will be discussed in more detail below. In a step 310, a determination is made as to whether or not the TTRF and CTIM have a fuel split listed in the look-up table. As one skilled in the art will understand, a fuel split is a commonly referred to term for the percentage of the available fuel flow that is directed to a specific fuel circuit of a combustor. The look-up table, as can be seen from FIG. 4, lists fuel splits in percentages for specific TTRF's and CTIM's. Given the number of variables, rarely will TTRF and CTIM correspond exactly to values listed in their look-up tables. However, if the TTRF and CTIM correspond to values listed in the look-up table for a specific fuel circuit, then in a step 312, the fuel flow for that fuel circuit is adjusted to the fuel split listed in the table, if an adjustment is necessary. For example, for the PM1 circuit, if the CTIM is 60 deg. F. and the calculated TTRF is 2200 deg. F., then the fuel split for the PM1 circuit is set to 20% of the available fuel flow. However, a majority of the time the measured CTIM and calculated TTRF will vary from the values listed in the table. When this occurs, it is necessary to linearly interpolate between the values listed in the table.

If the CTIM and TTRF do not correspond to values listed in the look-up table, then in a step 314, a determination is made as to whether or not only the TTRF corresponds to a value in the look-up table. If the TTRF corresponds to a value in the look-up table, then in a step 316, the fuel split is interpolated from two CTIM's listed in the look-up table that correspond to the TTRF. The two CTIM's used for the interpolation are typically two values that bracket the measured CTIM. For example, with reference to FIG. 4, if the TTRF is calculated to be 2200 deg. F. but the CTIM is 50 deg. F. for the PM1 circuit, then the actual fuel split is interpolated using the fuel split values from a CTIM of 40 deg. F. and 60 deg. F. In this example, the fuel split is interpolated to be 20.25% of the available fuel flow for a TTRF of 2200 deg. F. and a CTIM of 50 deg. F. Once the interpolation is complete, the fuel flow for the fuel circuit is adjusted to the identified fuel split in a step 318.

However, if the TTRF does not correspond to a turbine reference temperature listed in the look-up table, then in a step 320, a determination is made as to whether or not the CTIM corresponds to a value listed in the look-up table. If the CTIM is listed in the look-up table, then, in a step 322, the fuel split is interpolated from two TTRF's listed in the look-up table that bracket the calculated TTRF. For example, again with reference to FIG. 4, if the CTIM measures 60 deg. F. for the PM1 fuel circuit, but the TTRF is 2250 deg. F., then the fuel split is interpolated using a TTRF of 2200 deg. F. and 2300 deg. F. As such, the fuel split for PM1 would be 19% of the available fuel flow. Once the interpolation is complete in step 322, the fuel flow to the fuel circuit is adjusted in a step 324.

If neither the TTRF nor the CTIM correspond to values listed in the look-up table, then, in a step 326, it is necessary to interpolate the fuel split for the fuel circuit from two CTIM's and two TTRF's listed in the look-up table that preferably bracket the measured CTIM and calculated TTRF. Referring back to FIG. 4, for the PM1 fuel circuit, if the measured CTIM is 50 deg. F. and the TTRF is 2250 deg. F., it can be seen that neither of these values are listed in the look-up table, and therefore, each must be interpolated. For a TTRF of 2250 deg. F. the fuel splits associated with CTIM's of 40 deg. F and 60 deg. F are interpolated as 19.5% and 19% respectively from the bracketed TTRF's of 2200 deg. F. and 2300 deg. F. Therefore, for a TTRF of 2250 deg. F. and a CTIM of 50 deg. F., the fuel split is interpolated from these two fuel splits to be 19.25% of the available fuel flow. In a step 328, the fuel flow to the fuel circuit is adjusted to the interpolated fuel split identified in the step 326.

Once the fuel flow has been adjusted to one of the above-identified percentages, a determination is made in a step 330 as to whether or not additional fuel circuits are to be scheduled. Depending on the mode of operation of the combustor, there may or may not be other fuel circuits operating at the same time. If other fuel circuits are to be scheduled, then in a step 332, the fuel split identified from the look-up table is subtracted from the fuel balance to determine the remaining fuel balance and the process returns to step 302. For example, for the gas turbine engine 100 previously identified, the fuel split is determined for the quaternary circuit first, then PM1, and PM3, with the remaining fuel directed to the PM2 circuit. Therefore, if the CTIM is measured at 60 deg. F. and TTRF is calculated to be 2450 deg. F., then according to FIG. 4, it is determined that the quaternary circuit receives a 10% fuel split, which leaves 90% of the total fuel for the other three circuits. Then for the same CTIM and TTRF, the PM1 fuel split is 15%, which is 15% of the remaining 90%, or 13.5% of the total fuel flow. This leaves 76.5% of the total fuel flow remaining. Next, PM3 would be determined, which for this example would be 63% of the remaining 76.5%, or 48.2% of the total fuel flow. The remaining 26.8% of the total fuel flow is then directed to the final fuel circuit, PM2.

If there are no other fuel schedules for other fuel circuits to be determined, then in a step 334, the CTIM measurement is repeated and in a step 336 the TTRF is recalculated. A determination is made in a step 338 as to whether or not the calculated TTRF has changed. If the TTRF has changed, then the fuel flow must be adjusted to all circuits being used, and the process returns to step 304. However, if the TTRF has not changed, then the fuel flow levels are maintained in a step 340 and the process of measuring and verifying CTIM temperatures repeats itself.

In the event that either the measured CTIM or the TTRF results in a value outside of the values listed in the tables, then either the maximum or minimum value listed is used for the interpolation process.

It is important to note that the process defined above is one in which the measured and calculated variables can be used to determine the fuel splits. It is possible that the setting of the fuel splits could be determined in slightly different manner that is still within the scope of the present invention. For example, with respect to the process depicted in FIGS. 3A and 3B, CTIM could be considered first followed by TTRF. Furthermore, the control system 114 could follow a double interpolation-type program starting with either TTRF or CTIM.

In an alternate embodiment, a method of controlling a gas turbine engine having a compressor, at least one combustor, a turbine, and a control system is disclosed in which an alternate means is used to determine and control the fuel flow to a gas turbine engine given a measured compressor inlet temperature and a calculated turbine reference temperature. This method 500 is disclosed in detail in FIGS. 5A and 5B. In a step 502, a compressor inlet temperature (CTIM) is measured. Next, in a step 504, the CTIM is stored to the memory of the controller and in a step 506, a turbine reference temperature (TTRF) is calculated. As previously discussed, the TTRF is calculated in real-time, as the gas turbine engine operates, and is based on several measured parameters as well as various constants. For example, the TTRF is a function of at least compressor discharge pressure, exhaust pressure, and the change in pressure, or pressure drop, across the combustion system. In a step 508, a baseline fuel schedule is selected that corresponds to the fuel circuit for which the fuel flow is to be determined. In a step 510, a determination is made as to whether or not the TTRF corresponds to a value listed in the baseline schedule. If the TTRF is listed in the split schedule, then the baseline fuel schedule is selected in a step 512 that corresponds to the TTRF. For example, for the quaternary fuel schedule depicted in FIGS. 6A and 6B, if the calculated TTRF is 2200 deg. F. then the quaternary baseline schedule is 5% of the available fuel balance. If the TTRF is not listed in the baseline schedule, then in a step 514 the baseline fuel split is interpolated from two turbine reference temperatures that preferably bracket the calculated reference temperature.

Once the baseline fuel split has been determined, a bias parameter is then determined, where the bias parameter is a percentage change to the overall fuel flow and is a function of compressor inlet temperature (CTIM). Each fuel circuit has a unique set of bias parameters that are charted and shown in graphical form in FIGS. 6A-8B. Although the exact values vary for each TTRF and fuel circuit, a general trend is present in that as CTIM increases, the percentage of fuel biased towards a particular fuel circuit generally decreases.

In a step 516, a determination is made as to whether or not the measured CTIM corresponds to the TTRF. If the measured CTIM corresponds to a calculated TTRF, then the bias parameter is determined in a step 518. If the measured CTIM does not specifically correspond to the TTRF, then the bias parameter must be interpolated in a step 520 from two compressor inlet temperatures. For example, referring to FIG. 6A, if the TTRF for the quaternary fuel circuit is 2200, but the CTIM is 30 deg. F., then the bias parameter is interpolated to be 0.75% from the CTIM's corresponding to 20 deg. F. and 40 deg. F.

Once the bias parameter is determined, then the fuel split is adjusted to the sum of the baseline fuel split and the bias parameter for the fuel circuit in a step 522. For the example discussed above for the quaternary fuel circuit, a fuel split for a TTRF of 2200 deg. F. and a CTIM of 30 deg. F. would be a baseline fuel schedule of 5% plus 0.75% for the bias parameter for a total of 5.75% of the available fuel flow. By biasing the fuel flow higher for the lower CTIM, the combustion noise is reduced.

Figure 5A:
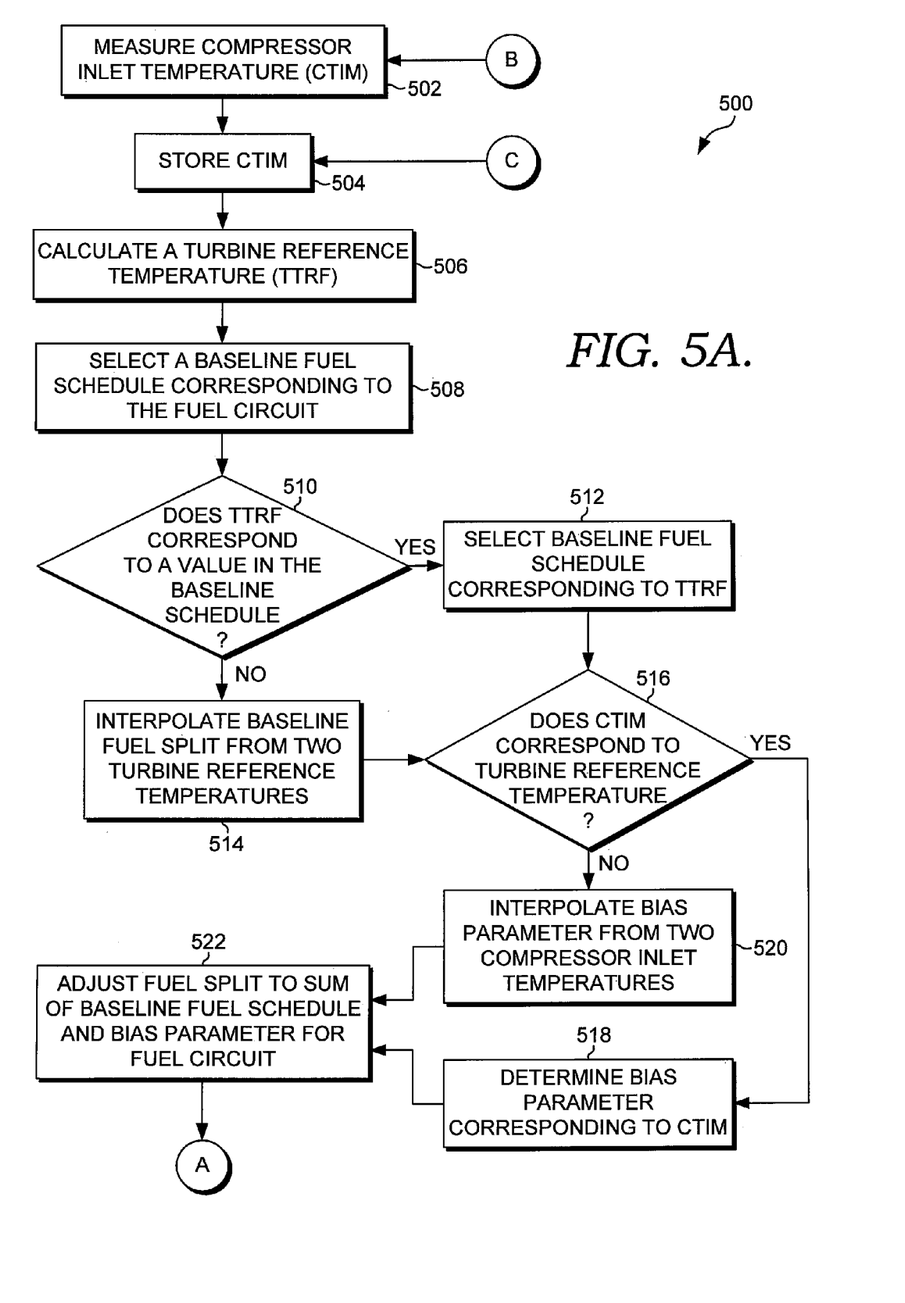
FIGS. 5A and 5B depict a method of controlling the fuel flow for a gas turbine engine in accordance with an alternate embodiment of the present invention.
Figure 5B:
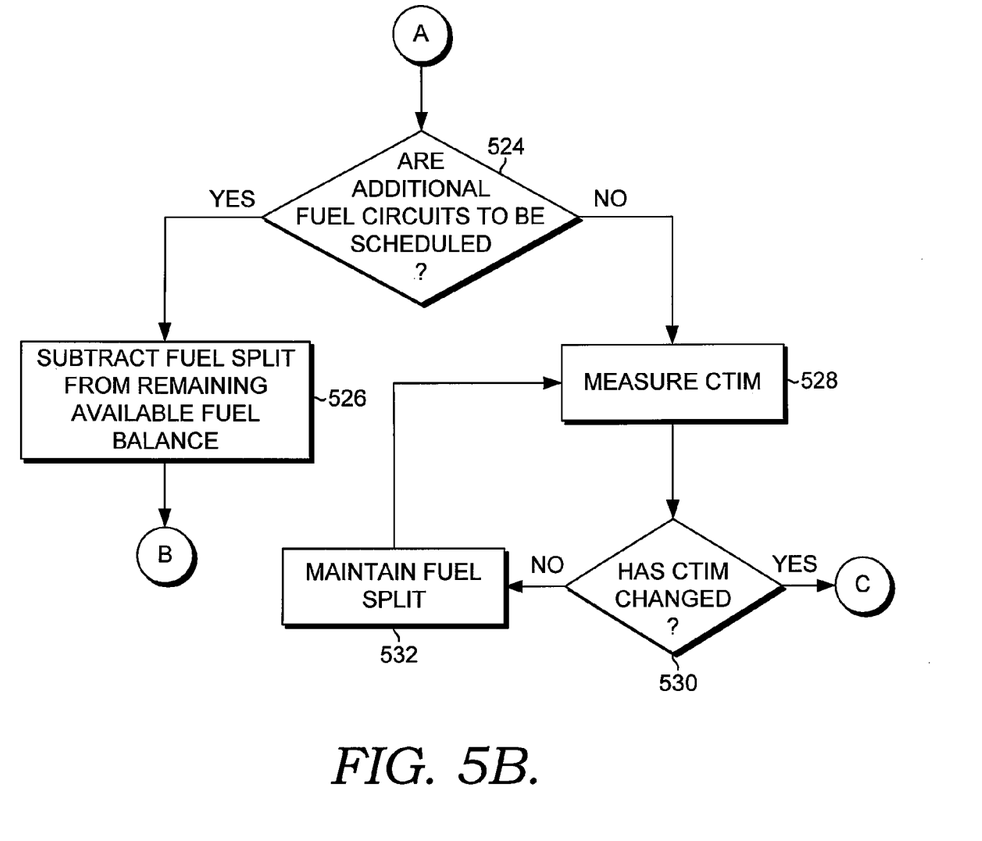
Figure 6A:
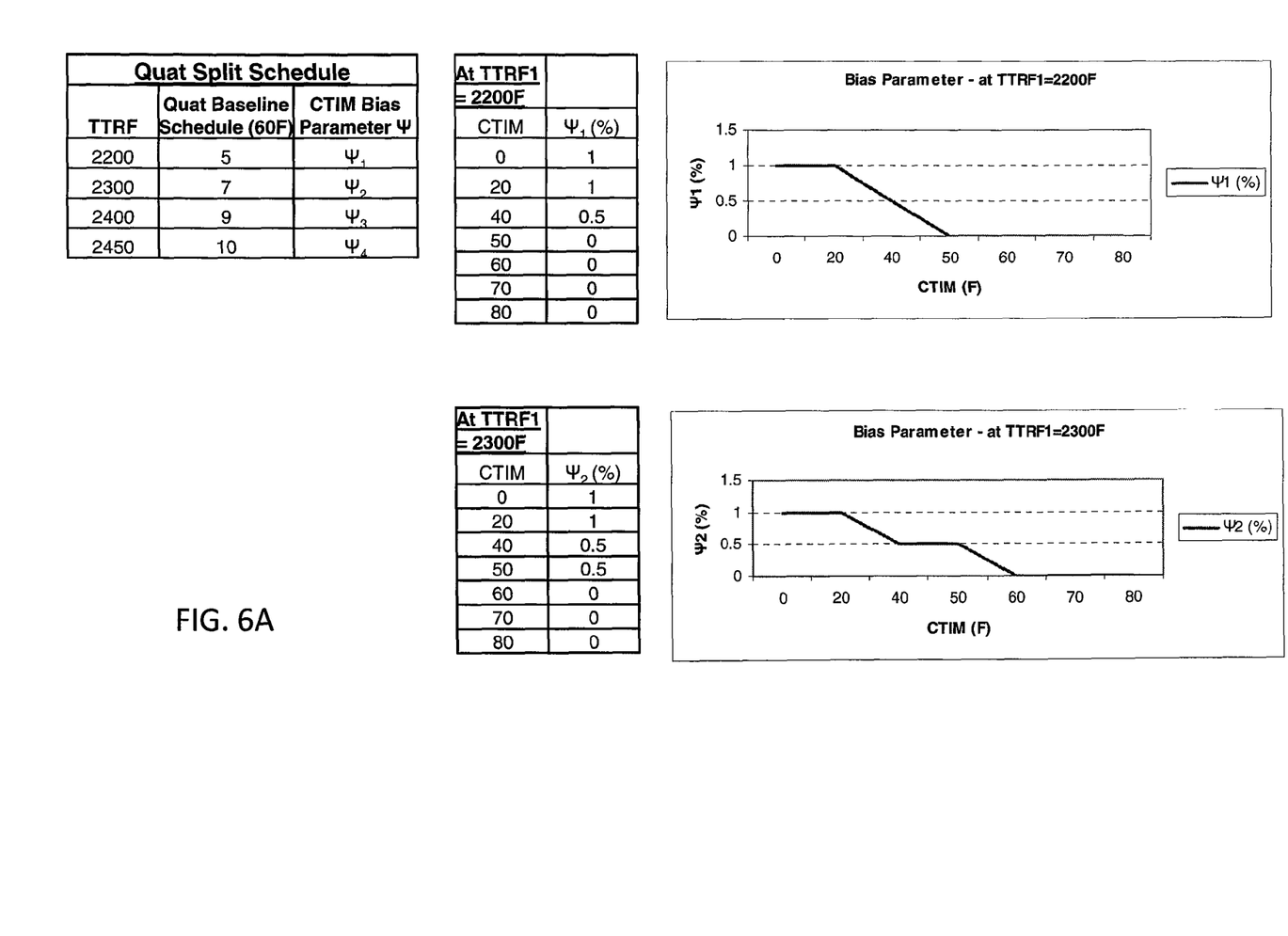
FIGS. 6A and 6B depict fuel schedule charts and graphs for a fuel circuit in accordance with the way of controlling fuel flow depicted in FIGS. 5A and 5B.
Figure 6B:
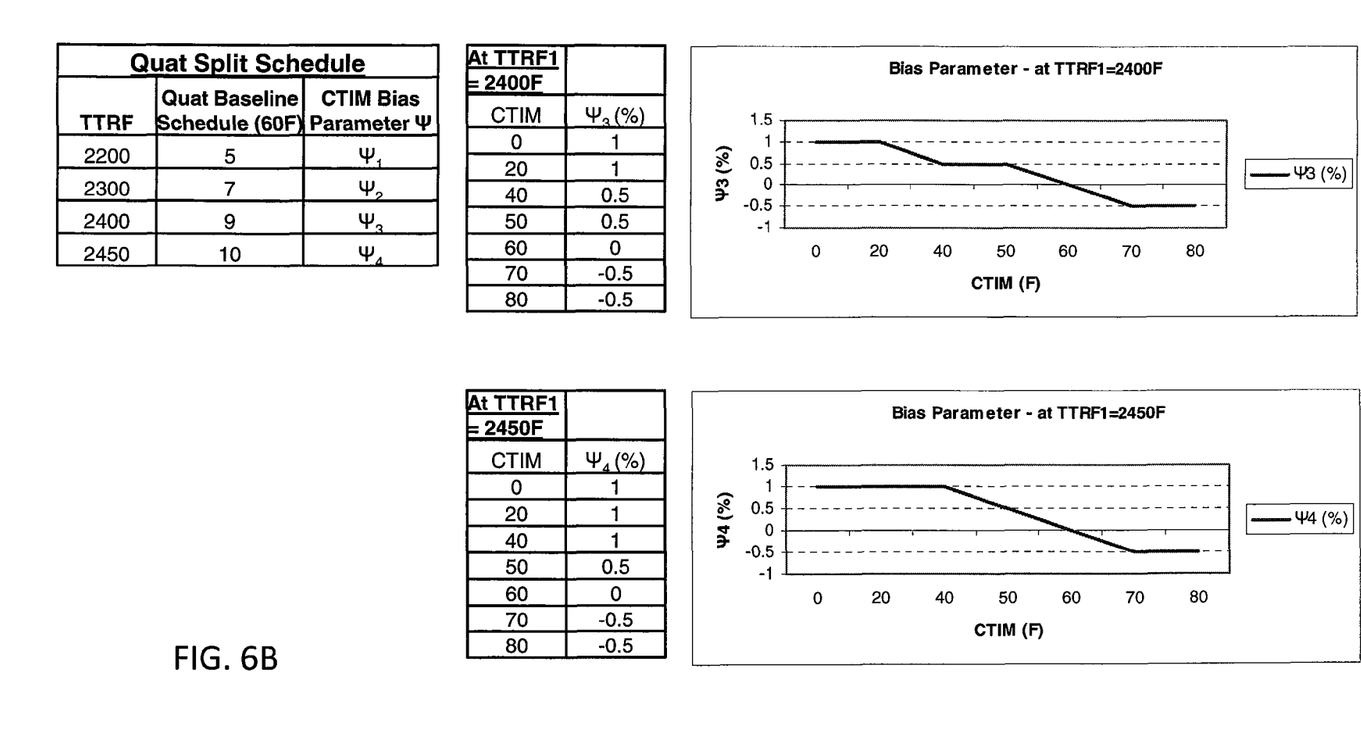
Figure 7A:
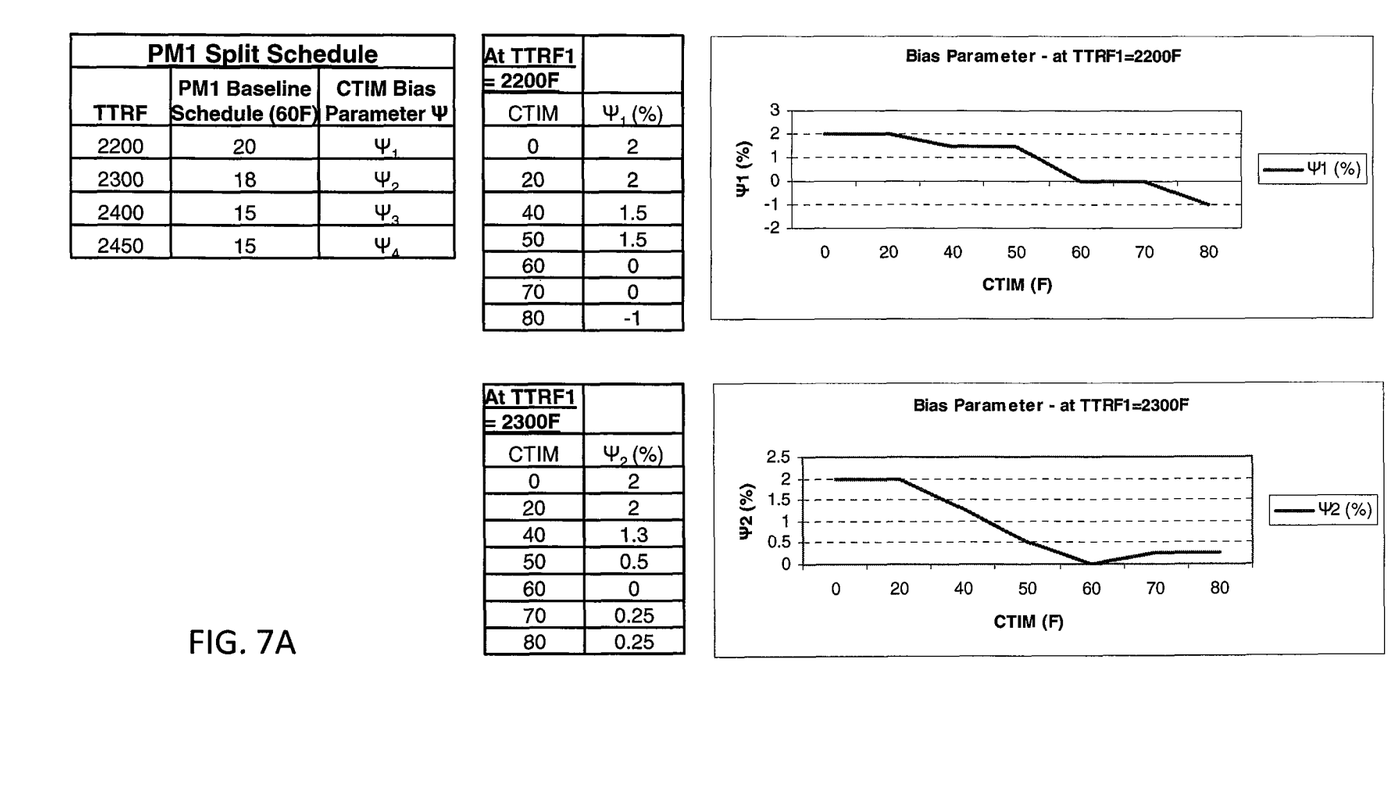
FIGS. 7A and 7B depict fuel schedule charts and graphs for an alternate fuel circuit in accordance with the way of controlling fuel flow depicted in FIGS. 5A and 5B.
Figure 7B:
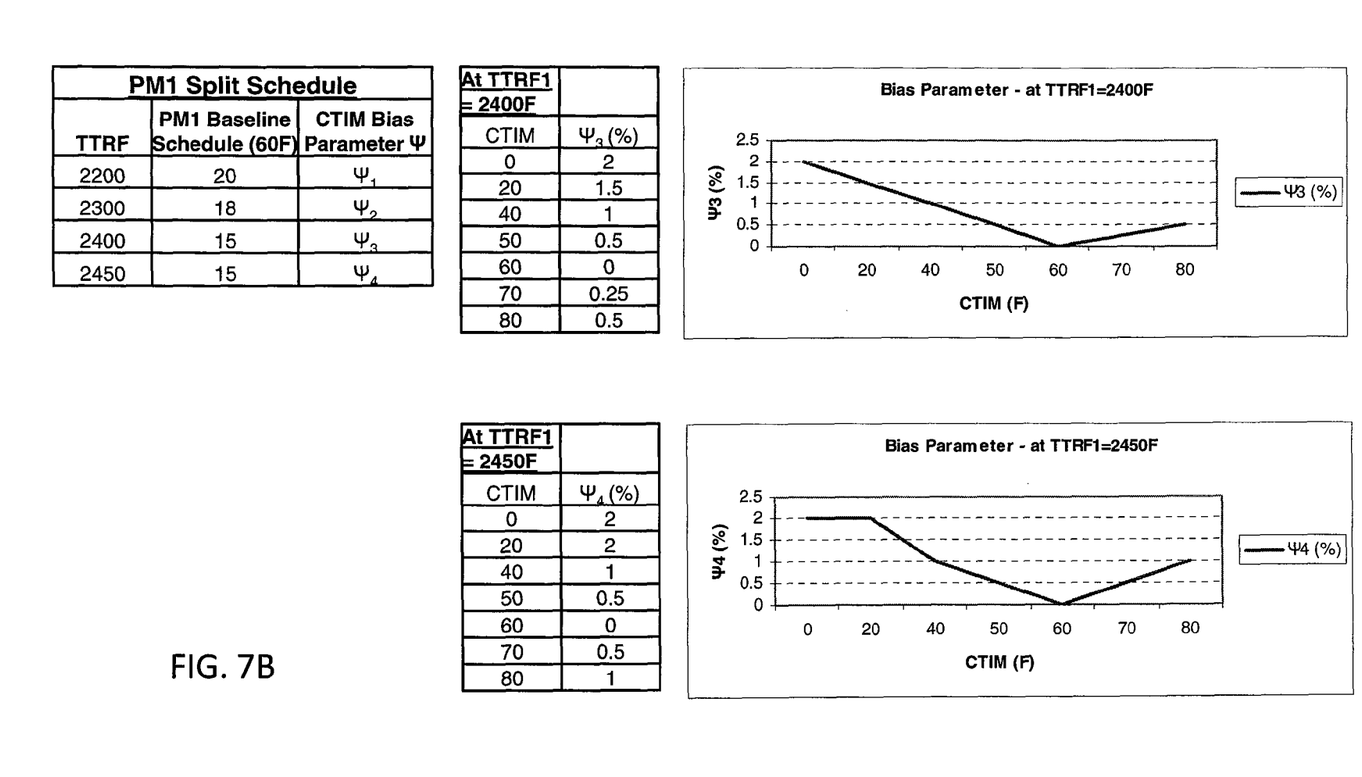
Figure 8A:
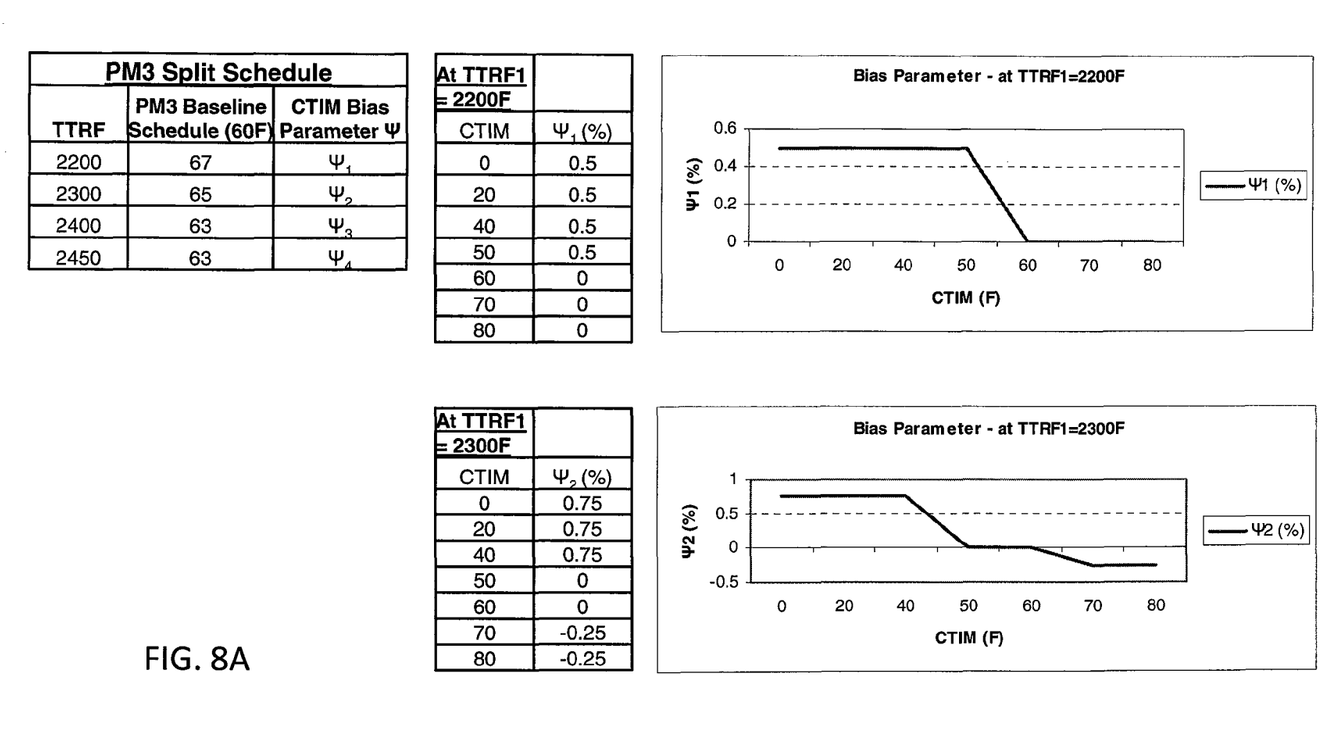
FIGS. 8A and 8B depict fuel schedule charts and graphs for an alternate fuel circuit in accordance with the way of controlling fuel flow depicted in FIGS. 5A and 5B.
Figure 8B:
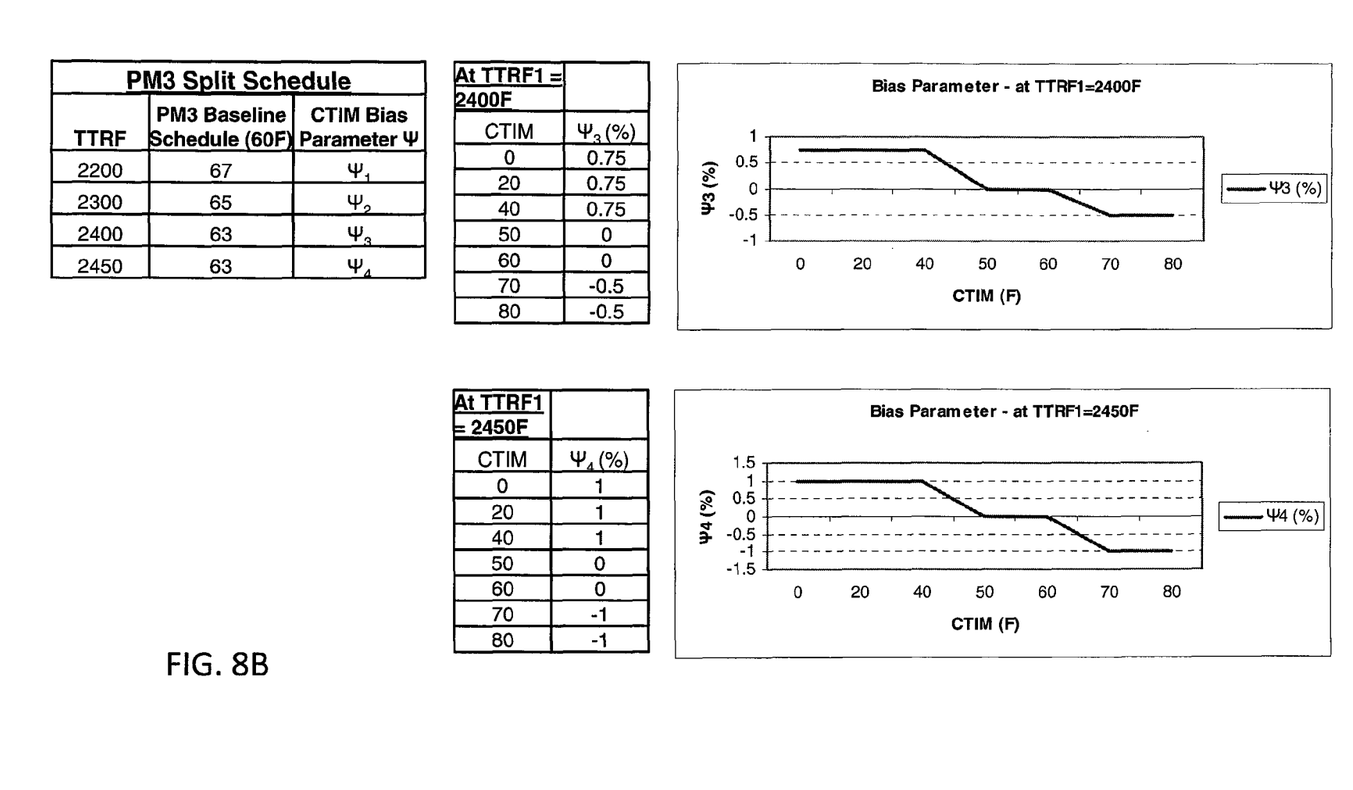

In a step 524, a determination is made as to whether or not there are additional fuel circuits to be scheduled. If additional fuel circuits are to be scheduled, then the fuel split identified above (baseline fuel schedule+bias parameter) is subtracted from the available fuel balance in a step 526 and the process returns to step 502 to calculate the fuel split for a different fuel circuit. However, if there are no other fuel circuits to be scheduled, then the process follows to a step 528 where the CTIM is measured and checked in a step 530 to determine if it has changed. If the CTIM has changed from what was originally measured, then the process returns to step 504. However, if the CTIM remains the same, then the process maintains the current fuel split in a step 532 and continues to monitor the CTIM. For the embodiment discussed herein, the fuel schedule is determined for four fuel circuits; the quaternary, PM1, and PM3, with the remaining available fuel being dedicated to the PM2 circuit.

In the event that either the measured CTIM or the TTRF results in a value outside of the values listed in the tables, then either the maximum or minimum value listed is used for the interpolation process.

It is important to note that the process defined above is one in which the measured and calculated variables can be used to determine the fuel splits. It is possible that the setting of the fuel splits could be determined in slightly different manner that is still within the scope of the present invention. For example, CTIM could be considered first followed by TTRF. Furthermore, the control system 114 could follow a double interpolation-type program starting with either TTRF or CTIM.

As previously discussed with respect to FIG. 2 and the embodiments disclosed herein, the steps through which the fuel splits are scheduled are programmed into the memory of the controller 112 as computer-readable instructions. These computer readable instructions consult look-up tables, split schedules, and bias parameter charts to determine or calculate the proper fuel split for given compressor inlet conditions at a calculated turbine reference temperature. The controller then activates various valves to each of the fuel circuits so as to open and/or close and monitor their positions and fuel flow rates passing therethrough by way of instrumentation so as to maintain the fuel flow at the desired rate.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

What is claimed is:

1. A method of controlling a gas turbine engine having a compressor, at least one combustor, a turbine, and a control system comprising:
    measuring a compressor inlet temperature;
    calculating a turbine reference temperature as a function of at least compressor discharge pressure, exhaust pressure, and pressure across the combustor;
    selecting a baseline fuel schedule for a fuel circuit corresponding to the turbine reference temperature;
    determining whether a baseline fuel split corresponds to the turbine reference temperature;
    determining a bias parameter so as to increase or decrease the baseline fuel split wherein the bias parameter is a percentage change in fuel split that varies as a function of the measured compressor inlet temperature for a given turbine reference temperature; and,
    adjusting the fuel flow for the fuel circuit to a sum of the baseline fuel split and the bias parameter.

2. The method of claim 1, further comprising the step of interpolating the baseline fuel split from two known fuel splits associated with two known turbine reference temperatures listed in the baseline fuel schedule if the calculated turbine reference temperature is not listed in the baseline fuel schedule.

3. The method of claim 1, further comprising the step of interpolating the bias parameter from two known compressor inlet temperatures.

4. The method of claim 1, wherein the bias parameter varies for each turbine reference temperature.

5. The method of claim 1, wherein the combustor has fuel splits determined for four fuel circuits.

6. The method of claim 1, wherein the bias parameter results in an increase, a decrease, or no change to the fuel split.

7. A gas turbine engine comprising:
    an inlet;
    a compressor;
    at least one combustor having at least two fuel circuits;
    a turbine; and,
    a control system having a processor and a memory component containing a series of computer-readable instructions that measures a compressor inlet temperature in real-time and calculates a turbine reference temperature that is a function of at least compressor discharge pressure, exhaust pressure and pressure across the combustor, wherein the compressor inlet temperature and turbine reference temperature are utilized to identify a fuel split for each fuel circuit of the combustor with each fuel split biased higher or lower based on measured compressor inlet temperature.

8. The gas turbine engine of claim 7, wherein the fuel split is a percentage of an available fuel balance.

9. The gas turbine engine of claim 7, wherein the computer-readable instructions consult look-up tables and interpolate between listed values in order to identify an optimal fuel split for a given compressor inlet temperature and turbine reference temperature.

* * * * *